T. TURNER.
Cultivator.
No. 22,316.
Patented Dec. 14, 1858.
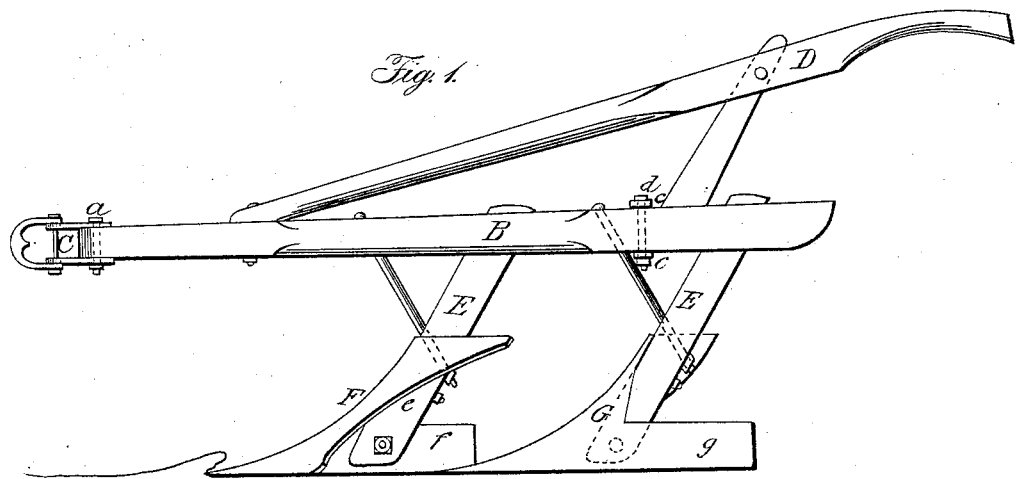
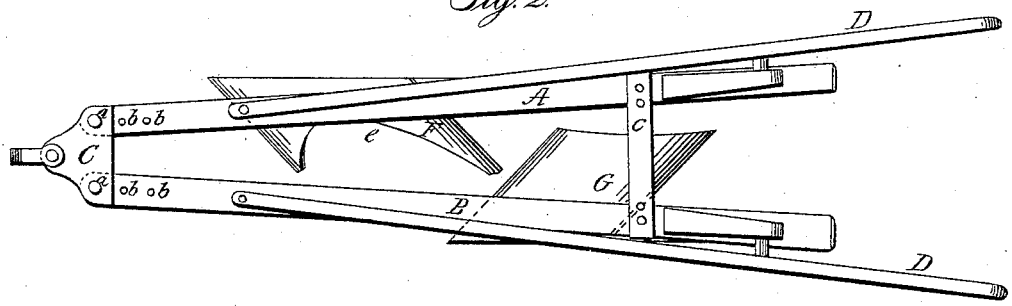
Witnesses:
Inventor:

UNITED STATES PATENT OFFICE.

THOMAS TURNER, OF MARYSVILLE, OHIO.

IMPROVEMENT IN CULTIVATORS.

Specification forming part of Letters Patent No. 22,316, dated December 14, 1858.

*To all whom it may concern:*

Be it known that I, THOMAS TURNER, of Marysville, in the county of Union and State of Ohio, have invented a new and Improved Cultivator-Plow; and I do hereby declare that the following is a full, clear, and exact description of the same, reference being had to the annexed drawings, making a part of this specification, in which—

Figure 1 is a side elevation of my invention. Fig. 2 is a plan or top view of the same.

Similar letters of reference indicate corresponding parts in the two figures.

This invention consists in the employment or use of two mold-boards, placed one in advance of the other and attached to separate beams, connected together so as to be capable of adjustment, the front mold-board being hollowed out or of crescent form, so as to allow the earth raised by it to pass over its share into the furrow and directly in front of the other mold-board, which casts it up in a pulverized state toward the crop under cultivation.

The object of the invention is to work the earth thoroughly or pulverize it before casting it up against the plants, and thereby render the implement much more efficient than the usual single plow or any other with which I am acquainted.

To enable those skilled in the art to fully understand and construct my invention, I will proceed to describe it.

A B represent two beams, the front ends of which are connected by pins $a$ in a metal cap, C, the front ends of the beams having a series of pin-holes, $b$, made vertically through them to admit of the longitudinal adjustment of the beams. (See Fig. 2.) To the back parts of the beams A B traverse-bars $c$ $c$ are attached by bolts $d$ $d$, said bolts being fitted in either of a series of holes made in the ends of the bars, so that the beams may be expanded or contracted, as desired. Each beam is provided with a handle, D, and to the under side of each beam an inclined bar, E, is attached. The bars E form standards for mold-boards F G, the mold-board F being in advance of the mold-board G.

The mold-board F is hollowed out at its side, as shown at $e$, or it may be termed as being of "crescent form," so as to fully expose the other mold-board, G. The mold-board G is of the usual form, but it is placed in a reverse position to the mold-board F, the landside $f$ of the plow F being at one side of the device and the landside $g$ of the mold-board G at the opposite side.

To the front side of the cap C a clevis, H, is attached, to which the whiffletree or draft-chain is attached.

The operation is as follows: As the implement is drawn along between the rows or drills of the crop the mold-board F casts the earth from the plants, the earth, owing to the crescent form of the mold-board F, passing over the share of said mold-board directly into the furrow formed by it and in front of the mold-board G, the mold-board G throwing the earth up to the plants. The earth, therefore, it will be seen, is turned twice, and in consequence of being thus worked is pulverized or lightened up, so that it will be cast up against the plants in a loose state, permeable to air and moisture. In case the earth be very lumpy and stiff, the beam A may be adjusted rather farther forward than if the earth be rather fine, so that the earth may be fully turned over before being acted upon by the mold-board G, and therefore subjected to the greatest action, for the purpose of being pulverized as finely as possible. The two mold-boards are adjusted laterally, so as to suit the width of the spaces between the rows by distending the beams A B a greater or less distance apart, the plates $c$ $c$ and bolts $d$ securing the beams in the desired position.

I do not claim a double plow, nor do I claim two mold-boards attached to beams rendered capable of a lateral adjustment, for expanding plows and cultivators have been previously used; but,

Having thus described my invention, what I claim as new, and desire to secure by Letters Patent, is—

The combination of the pulverizing mold-board F and hilling mold-board G, constructed as shown, and attached respectively to the longitudinally and laterally adjustable beams A B, the whole being arranged substantially as and for the purpose set forth.

THOMAS TURNER.

Witnesses:
JOHN H. WOOD,
S. McMAHILL.